(12) United States Patent
Naidu et al.

(10) Patent No.: US 11,269,882 B2
(45) Date of Patent: Mar. 8, 2022

(54) SYSTEM AND METHOD FOR RETRIEVING DATA FROM SERVER COMPUTERS

(71) Applicant: SAGE SOUTH AFRICA (PTY) LTD, Johannesburg (ZA)

(72) Inventors: Kavendrin Kistensamy Naidu, Glenwood (ZA); Darryl Parker Smith, Durban (ZA)

(73) Assignee: SAGE SOUTH AFRICA (PTY) LTD, Johannesburg (ZA)

( * ) Notice: Subject to any disclaimer, the term of this patent is extended or adjusted under 35 U.S.C. 154(b) by 238 days.

(21) Appl. No.: 16/340,681

(22) PCT Filed: Oct. 9, 2017

(86) PCT No.: PCT/IB2017/056218
§ 371 (c)(1),
(2) Date: Apr. 9, 2019

(87) PCT Pub. No.: WO2018/069811
PCT Pub. Date: Apr. 19, 2018

(65) Prior Publication Data
US 2019/0294610 A1      Sep. 26, 2019

(30) Foreign Application Priority Data
Oct. 11, 2016   (GB) .................................. 1617232

(51) Int. Cl.
*G06F 16/00* (2019.01)
*G06F 16/2453* (2019.01)
*G06F 16/242* (2019.01)
*G06F 16/25* (2019.01)
*G06F 3/0482* (2013.01)

(52) U.S. Cl.
CPC .... *G06F 16/24547* (2019.01); *G06F 16/2448* (2019.01); *G06F 16/25* (2019.01); *G06F 16/252* (2019.01); *G06F 3/0482* (2013.01)

(58) Field of Classification Search
CPC ........... G06F 16/2448; G06F 16/24534; G06F 16/24547; G06F 16/25; G06F 16/252; G06F 3/0482
USPC .................................................. 707/705–780
See application file for complete search history.

(56) References Cited

U.S. PATENT DOCUMENTS

| | | | |
|---|---|---|---|
| 5,873,080 A | 2/1999 | Coden | |
| 9,531,801 B1* | 12/2016 | Cantrell | .............. H04L 41/5041 |
| 9,823,950 B1* | 11/2017 | Carrier | .................... G06F 9/543 |
| 2012/0246190 A1* | 9/2012 | Surtani | .................... G06F 16/27 |
| | | | 707/769 |
| 2014/0149537 A1* | 5/2014 | Shankaran | .......... H04L 41/0816 |
| | | | 709/216 |

(Continued)

OTHER PUBLICATIONS

Information Disclosure Statement received in PCT/IB2017/056218 dated Jan. 16, 2018.

*Primary Examiner* — Michelle N Owyang
(74) *Attorney, Agent, or Firm* — Burns & Levinson, LLP; Steven Mills; Daniel McGrath (57) ABSTRACT

A system for retrieving data from one or more server computers, comprising: a parser operable to generate a plurality of application programming interface, API, calls to one or more API endpoints of the one or more server computers from a query; an API call executor operable to execute the API calls and receive the results; and a query engine operable to execute the query on the received results.

18 Claims, 4 Drawing Sheets

(56) References Cited

U.S. PATENT DOCUMENTS

2014/0172833 A1    6/2014  Taylor
2014/0214897 A1    7/2014  Zhu
2016/0063017 A1*   3/2016  Bartlett ................. G06F 16/245
                                                         707/759

* cited by examiner

| Row | Id | Name | Descrip... | Cat | Balance | Account... | Categor... |
|---|---|---|---|---|---|---|---|
| 1 | -5 | Bad Debts | System... | 4 | 0 | 4 | Expenses |
| 2 | 106340 | Bank Ch... |  | 4 | 818258,46 | 4 | Expenses |
| 3 | 3607831 | Bike Parts |  | 1 | 5042 | 1 | Sales |
| 4 | 27186 | Cost of... |  | 2 | 7997 | 2 | Cost of... |
| 5 | -17 | Cost of... | System... | 2 | 0 | 2 | Cost of... |
| 6 | -14 | Custome... | System... | 4 | 0 | 4 | Expenses |
| 7 | 208 | Deliver... |  | 3 | -56893,65 | 3 | Other I... |
| 8 | -4 | Discoun... | System... | 4 | 0 | 4 | Expenses |
| 9 | -3 | Discoun... | System... | 3 | 0 | 3 | Other I... |
| 10 | 168231 | Electri... |  | 4 | 1403318,48 | 4 | Expenses |
| 11 | -23 | Forex G... | System... | 4 | 0 | 4 | Expenses |
| 12 | -22 | Forex R... | System... | 4 | 0 | 4 | Expenses |
| 13 | -21 | Forex U... | System... | 4 | 0 | 4 | Expenses |
| 14 | 168229 | General... |  | 4 | 462035,35 | 4 | Expenses |
| 15 | 168228 | Insurance |  | 4 | 3389995,64 | 4 | Expenses |
| 16 | -18 | Inventory | System... | 6 | 0 | 6 | Current... |
| 17 | -6 | Invento... | System... | 6 | 0 | 6 | Current... |

Edit Container: Sage One Data

Edit Query Insert Help

SELECT
Accounts.Id,
Accounts.Name,
Accounts.Description,
SUBSTRING (Accounts.Category,13,1) AS Cat,
Accounts.Balance,
AccCategory.Id AS AccountCatId,
AccCategory.Description AS CategoryDesc
FROM Accounts
LEFT JOIN AccCategory
ON SUBSTRING (Accounts.Category,13,1)=AccCategory.Id OK
Cancel
Execute 35 Rows | Connection: (UQE (local API definition file))

SYSTEM AND METHOD FOR RETRIEVING DATA FROM SERVER COMPUTERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field of the Invention

The present application relates to a system and method for retrieving data from server computers, particularly server computers that are part of cloud systems.

Traditional database management systems (DBMSs) typically run on server computers, and allow remote access to the data held therein via an application programming interface (API) that complies with a particular standard. Such APIs are configured to receive a query, execute it against the database and provide a set of results to the client accessing the database via the API.

For example, many DBMSs provide an Open Database Connectivity (ODBC) API, which comprises a driver that acts as a layer between the application accessing the API and the DBMS. The ODBC API receives an SQL query from the application and passes it to the DBMS, which then executes it and returns the results. Other APIs include OLE DB (Object Linking and Embedding, Database), JDBC (Java Database Connectivity) and ADO.NET.

The use of a standard API such as ODBC has several advantages. Firstly, it abstracts the client from the particular DBMS being used, so that similar functionality is provided regardless of whether the underlying DBMS is Microsoft SQL Server, MySQL, Oracle®, or one of the many other DBMSs available. Secondly, the use of a standard API supports the syntax of a standard query language, such as SQL which is defined by standards organizations ANSI and ISO. SQL in particular provides a very well-known and understood language, and comprises powerful and flexible mechanisms for filtering, joining and aggregating data, therefore providing a very advantageous means of retrieving data from a relational database.

While the traditional model of access via ODBC has these advantages, difficulties arise with accessing network-based or cloud-based data using this model. Particularly, cloud-based systems are often multi-tenanted, in that multiple users (i.e., tenants) share applications and resources, including databases. This model reduces wasted resource and can improve remote accessibility of the data. However, a single database may comprise data belonging to numerous tenants. Accordingly, it is not acceptable to provide unfettered access to such databases over an API such as ODBC, because security concerns arise from tenants potentially being able to access the data of other tenants.

Consequently, alternative means of accessing cloud-stored data have been developed. One common way is to expose the data via a REST (representational state transfer) API endpoint. REST APIs are typically configured to receive a request over HTTP (e.g., by accessing a particular Uniform Resource Indicator (URI) which functions as the endpoint), and respond over HTTP, by using standard HTTP methods such as GET and POST. Data returned by REST APIs takes the form of JSON (JavaScript Object Notation) or XML (Extensible Markup Language). In order to ensure data relating only to a particular tenant is returned, the client will include a tenant ID (e.g. a company ID) as a parameter in the URI used for calling the API. For example, the URI for calling an API that returns account balances for a particular tenant may take the following form:

http://exampledomain.com/api/1.1.1/AccountBalance/Get?CompanyId=@CO@ wherein "@CO@" is replaced by the company ID.

Each REST endpoint is usually configured to receive a simple request for a narrowly-specified type of data and return either a simple list or a list of lists. For example, a cloud accountancy system may comprise REST endpoints that respectively and separately expose a list of account categories, a list of budget values, a list of account balances and a list of budget sets.

Difficulties arise in that REST-based access to data does not allow for the use of a query language such as SQL, and so there is no easy way to join data received from different endpoints, filter the received data or carry out other complex operations in a flexible way using a well-defined language. Accordingly, in order to allow correlation and manipulation of the data retrieved from the REST endpoint, code must be written in advance by a system developer. However, in many scenarios it is highly desirable for end users to be able to query the data. For example, in the financial and accountancy fields, it is typical for end users to use SQL to define complex customized reports.

SUMMARY OF THE INVENTION

According to aspects of the present application, there is provided an apparatus and method as set forth in the appended claims. Other features of the invention will be apparent from the dependent claims, and the description which follows.

According to a first aspect of the present application, there is provided a system for retrieving data from one or more server computers, comprising: a parser operable to generate a plurality of application programming interface, API, calls to one or more API endpoints of the one or more server computers from a query; an API call executor operable to execute the API calls and receive the results; and a query engine operable to execute the query on the received results.

Illustratively, the query may be an SQL query. Additionally, the one or more server computers may comprise a plurality of server computers. The one or more server computers may be located remotely from the system. The one or more server computers may be housed in a single physical location, preferably a data center, or may be distributed over a plurality of physical locations and connected via appropriate network connections. The one or more server computers may comprise a cloud system or form a part of a cloud system.

The parser may be operable to identify one or more API endpoint addresses or aliases in the query and generate a corresponding API call, wherein each alias corresponds to an address of one of the API endpoints. The parser may be operable to identify the aliases using endpoint reference data, preferably comprising a list of aliases and corresponding API endpoint addresses. The endpoint reference data may additionally comprise API call parameter data, specifying mandatory and optional parameters for each API call. The endpoint reference data may be stored in an endpoint reference storage. The parser may be operable to transform the query into a data structure, preferably a parse tree or abstract syntax tree, and identify the aliases from the data structure, preferably by traversing the data structure. The parser may be operable to identify the aliases using one or more regular expressions. The parser may be operable to identify one or more columns associated with each API endpoint address or alias in the query, the parser may be operable to identify a filter associated with an API endpoint address or alias in the query.

The parser may be operable to check whether the query has valid syntax, preferably before generating the API calls.

The system may comprise an endpoint update unit, operable to update the endpoint reference data. The endpoint update unit may be operable to access a service definition corresponding to, and preferably provided by, the API endpoint. The endpoint update unit may be operable to update the endpoint reference data based on the service definition. The service definition may comprise one or more of: a service alias; names of fields provided in the results; information indicating whether the endpoint supports fetching of specified fields; information indicating whether the endpoint supports filtering of data; the types of data of each field, and mandatory and optional parameters that must be provided in the API call to the API endpoint. The endpoint update unit may be operable to determine an alias or address for the API endpoint based on the service definition, preferably based on the service alias. The endpoint update unit may update the endpoint reference periodically, dynamically or in response to a user command.

The API call executor may be operable to execute each API call by accessing the API endpoint and receiving the result therefrom. At least one of the API calls may comprise one or more parameters. The parameter may be a common parameter to be included in each API call, such as a tenant ID. The parameter may be based on an identified filter. Each API endpoint may be located in a cloud system. Each API endpoint may be operable to provide data from a remote data store of the one or more server computers as the results. The remote data store may be a database, preferably a relational database. Each API endpoint may be operable to provide data from one or more tables of the database. Alternatively, the remote data store may be a NoSQL database or a flat file. The remote data store may be associated with a remote application. Each remote application and/or remote data store may comprise data corresponding to multiple tenants, for example, multiple individuals, companies or other organizations. The applications may comprise accountancy applications, payroll applications, supply chain management applications, enterprise resource planning applications, human resource management applications, business intelligence applications, and/or customer relationship management applications. The applications may comprise applications that make common variable data items available, preferably one or more of: currency exchange rates, stock and/or share values, interest rates, bookmakers' odds, transport information and/or weather data. Each API endpoint may be a Representational State Transfer, REST, API endpoint. Each API endpoint may be accessible via Hypertext Transfer Protocol, HTTP, or Secure HTTP, HTTPS, preferably via a Uniform Resource Indicator, URI. The API endpoint addresses may each be a URI.

The results may be in one of Javascript Object Notation, JSON, format or Extensible Markup Language, XML, format. The results may comprise attribute-value pairs. The API executor may be operable to store the results in a call result storage. The API call executor may be operable to parse the results, preferably to extract the attribute-value pairs, and store the extracted results in the call result storage. The call result storage may comprise a call result database, preferably a relational database. The call result database may be an in-memory database, configured to reside primarily in system memory. The call result database may comprise a plurality of tables, each table being operable to store the results of an API call. The query engine may be operable to execute the query against the results stored in the call result storage, preferably the call result database. The API call executor may be configured to insert a common parameter into each API call, preferably a tenant ID. The call result storage may be temporary. The API call executor may be operable to create the call result storage before executing the API calls, preferably based on the aliases and/or columns identified by the parser. The query engine may be operable to discard or delete the call result storage after the executing the query.

The system may comprise an interface operable to receive the query. The interface may comprise a graphical user interface, comprising a query entry portion operable to receive a user query, and a result display portion to display the results. The interface may comprise a network interface operable to receive a query from a user and provide the results thereto over a suitable network connection. The query may be part of a pre-defined report.

One, or more, of the parser, the API call executor and the query engine may be located remotely from the other elements of the system.

According to a second aspect of the present application, there is provided a method of retrieving data from one or more server computers, the method comprising: generating a plurality of application programming interface, API, calls to one or more API endpoints of the server computers from a query; executing the API calls; receiving the results, and executing the query on the received results.

Further aspects of the components associated with the method of the second aspect are defined hereinabove in relation to the first aspect and may be combined in any combination.

According to a third aspect of the present application there is provided a computer-readable medium having instructions recorded thereon which, when executed, cause a computing device to perform the method of the second aspect.

Further aspects of the components associated with the computer-readable medium of the third aspect are defined hereinabove in relation to the first and second aspects and may be combined in any combination.

BRIEF DESCRIPTION OF THE DRAWINGS

For a better understanding of the invention, and to show how embodiments of the same may be carried into effect, reference will now be made, by way of example, to the accompanying diagrammatic drawings in which.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION

Embodiments in accordance with the present application may be embodied as an apparatus, method, or computer program product. Accordingly, the present application may take the form of an entirely hardware embodiment, an entirely software embodiment (including firmware, resident software, micro-code, etc.), or an embodiment combining software and hardware aspects that may all generally be referred to herein as a "module" or "system." Furthermore, the present application may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In overview, one or more aspects of the present application are directed to transforming a query in a query language into a series of calls to API endpoints, and then collating the results and performing the query thereon. The collating of the results allow complex queries to be run against data, for example cloud-stored data, made accessible via AP's. In some examples, means are provided for updating data linking notional database tables with API endpoints. As identified above, this approach addresses the inefficiencies of previous approaches including the increased efficiency in the operation and execution of requests by a computing device. Additional efficiencies related to the utilization of network resources to access data via directed APIs are related to one or more aspects of the present application. Additional benefits and efficiencies are also within the scope of the present application.

Figure 1:
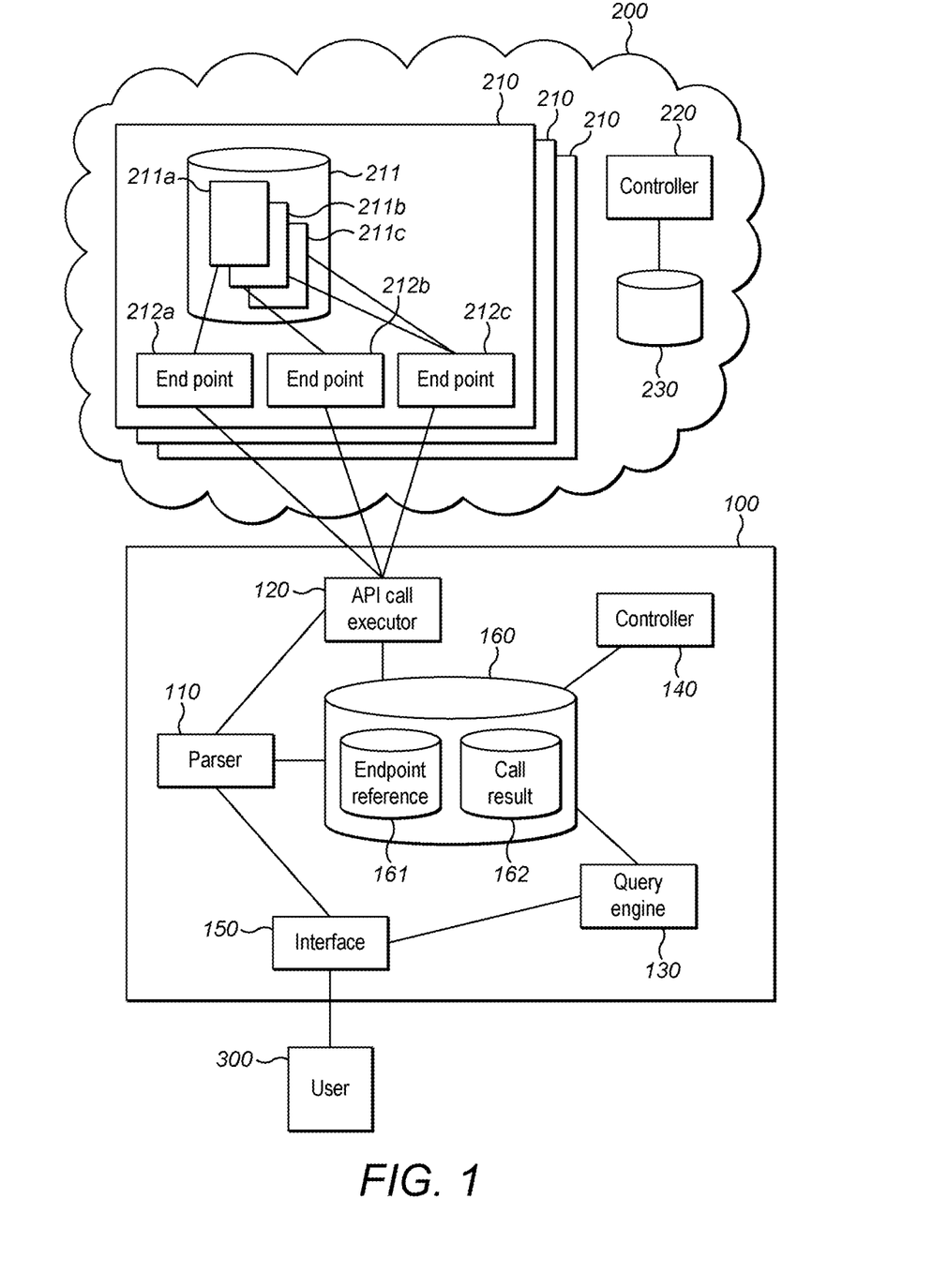
FIG. 1 is a schematic block diagram of an example system for retrieving data from one or more server computers.

FIG. 1 shows an example system 100 for retrieving data from one or more server computers, and one or more server computers.

In one example, the one or more server computers are part of a cloud system 200. The cloud system 200 comprises to one or more server computers. The server computers may be housed in a single physical location, such as a data center, or may be distributed over numerous physical locations and connected via appropriate network connections. These network connections may also take any suitable form, including secure wired and/or wireless communication links and may encompass wide area networks such as private leased lines or the Internet. In other examples, the server computers may be connected to the system 100 by a local network, or form part of a remote system that is not cloud based.

The cloud system 200 generally comprises storage 230 and a controller 220. The storage 230 comprises suitable persistent storage means, including hard disk drives, solid state drives, RAID arrays and the like. The storage 230 may comprise a single storage device on a single server, but typically will comprise multiple storage devices distributed over several servers. The storage 230 stores, either permanently or temporarily, any data that is required for the operation of the cloud system 200. The controller 220 comprises suitable software and hardware for managing and controlling the cloud system 200, including one or more processors and cloud management software. The processors may be distributed over several servers.

The cloud system 200 comprises one or more cloud-hosted applications 210. Each application 210 comprises a data store 211, storing data required for the functioning of the application and/or data which is available to be accessed by external systems such as the system 100. In one example, the data store 211 is a relational database, comprising a plurality of database tables 211 a, 211 b, 211 c. In further examples, the data store 211 may take other forms, including a collection of flat files (e.g. comma-separated values), spread sheets, non-relational databases such as NoSQL databases, or other data storage and organization means that would be familiar to those skilled in the art.

It will be understood that each application 210 and data store 211 may comprise data corresponding to multiple tenants, for example, multiple individuals, companies or other organizations. It will be further understood that the purpose and functionality of the applications and the data available to be accessed by external systems may be diverse, and may include financial applications such as accountancy applications or payroll applications, supply chain management applications, enterprise resource planning applications, human resource management applications, business intelligence applications, customer relationship management applications and so on.

Furthermore, it will be understood that the applications 210 may include applications that make certain common, widely-used but variable data items available. For example, the data items may include currency exchange rates, stock and/or share values, interest rates, bookmakers' odds, transport information (e.g. flight data), weather data and the like.

Each application 210 makes certain data stored in the data store 211 available to external systems via one or more API endpoints 212a, 212b, 212c. Each endpoint 212 is configured to provide a particular subset of the data stored in the data store 211. For example, each endpoint 212 may provide a list of entities from a particular database table 211 a-c, or if the data store 210 comprises a collection of files, from a particular file. In other examples, an endpoint 212 may be configured to combine data from two or more database tables 211 or files.

In one example, each endpoint 212 may be operable to receive one or more parameters. For example, the parameters may include a tenant ID to ensure the data returned is data belonging to a particular tenant.

In one example, each endpoint 212 is a REST API endpoint—e.g., a stateless API wherein each call to the API comprises all necessary information to provide the response, and the application 210 stores no contextual information to maintain state between API calls. Each endpoint 212 is accessible via HTTP or HTTPS, by accessing a Uniform Resource Indicator (URI) or Uniform Resource Locator (URL). Particularly, the endpoint 212 may be accessed by one or more HTTP methods, such as POST, GET, PUT, PATCH or DELETE, with GET being particularly suitable for requesting data to be returned from the endpoint 212. The parameters to the API call may be included in the URI/URL.

The endpoint 212 is configured to respond via HTTP or HTTPS with a message comprising a response code. For example, if the call is unsuccessful, the response may be one of "400—Bad Request", "401—Unauthorized", "403—Forbidden", or "404—Not found", depending upon the reason for the call being unsuccessful. If the call is successful, the response may be "200—OK", and the message will also comprise the requested data.

In one example, the requested data is returned in JSON (JavaScript Object Notation) format, which comprises a list of attribute-value pairs in a number of predefined data types, including number, string, Boolean, array or object. An example of a JSON representation describing a person is shown below:

```
{
    "firstName": "John",
    "lastName": "Smith",
    "isAlive": true, "age": 25,
    "address": {
        "streetAddress": "21 2nd Street",
        "city": "New York",
        "state": "NY",
        "postalCode": "10021-3100"
    },
    "phoneNumbers": [
        {
            "type": "home",
            "number": "212 555-1234"
        },
        {
            "type": "office",
            "number": "646 555-4567"
        }
    ],
    "children": [ ],
    "spouse": null
```

In a further example, the requested data may be returned in XML (Extensible Markup Language).

The system 100 for retrieving data from one or more server computers 100 comprises a parser 110, an API call executor 120, a query engine 130, a controller 140, an interface 150 and a storage 160. The system 100 may comprise a personal computer, mobile device, server computer or any other suitable computing device. The system 100 may be a software component that is part of a larger system, such as a reporting application. The system 100 may alternatively be a cloud-hosted system or a distributed system.

The controller 140 is configured to coordinate and control the operation of the other components of the system 100, and may comprise one or more processors, an operating system and any other suitable software and/or hardware for generally controlling the system 100.

The storage 160 is configured to store, either temporarily or permanently, any data required for the operation of the system. The storage 160 may comprise comprises suitable persistent storage means, including hard disk drives, solid state drives, RAID arrays, Random Access Memory (RAM) and the like. In one example, the storage 160 comprises an endpoint reference storage 161 and a call result storage 162, which will be described in detail below.

Figure 4:
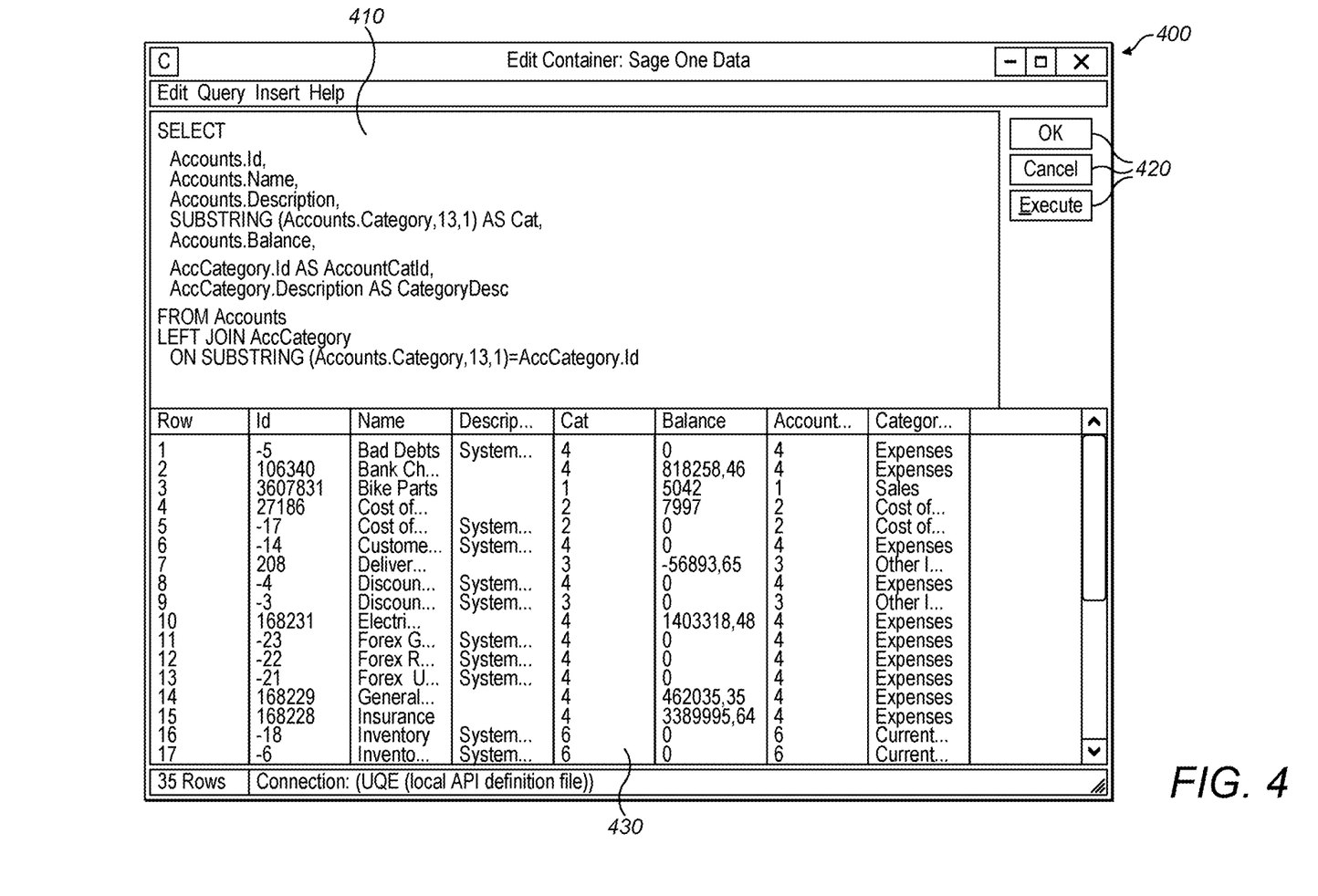
FIG. 4 is an example graphical user interface of an example system.

The parser 110 is configured to receive a query from a user 300 via the interface 150. In one example, the interface is a graphical user interface (GUI), in which a user enters a query and the results thereof are displayed. FIG. 4 shows an example GUI 400, comprising a query entry portion 410 in which a user may type a query, buttons 420 to execute the query and a results display panel 430 to display the results, for example in a tabular format.

In further examples, the interface 150 may be a network interface, such as an API, which is configured to receive a query from a system operated by a user 300 over a suitable network connection. For example, the system operated by the user 300 may be a reporting application configured to provide reports, such as financial reports, and the queries may be part of one or more user-defined reports. In such an example, the interface 150 may provide the results of the query to the system operated by the user 300 over the network connection, using a message of a suitable protocol. In one example, the interface 150 may be a REST API similar to those described above with reference to the cloud system 200.

In one example, the query is an SQL query. However, it will be understood that the parser 110 may be configured to receive queries in other query languages. The query comprises references to one or more tables. For example, the query shown in query entry portion 410 refers to the table "Accounts". However, the reference in the query to the table "Accounts" does not correspond to a database table of the system 100, but instead corresponds to data made available by one of the APIs 212a-c, and therefore acts as an alias for the API-based data. In further examples, the query may contain the address of the API (e.g. the URI), rather than an alias representing the address. For example, a simple query including the address would read "SELECT/*FROM http://example.com/accounts".

The user 300 formulating the query may be provided with a database schema defining a database structure (i.e. a list of tables and a list of fields stored in each table), wherein the tables each correspond to data made available by one of the APIs 212a-c. Accordingly, the user 300 can provide a query to the parser 100 that relies on data stored in the cloud system 200, but which can be written as if the data is stored in a traditional relational database.

The parser 110 is configured to parse the query to produce a list of API calls. In one example, the parser 110 identifies all aliases in the query, and then generates an API call corresponding to each alias.

In one example, the parser 110 is further configured to check the validity of the syntax of the query before parsing the query to produce the list of API calls.

In one example, the parser 110 is configured to access stored data listing aliases and detailing the correspondence between an alias and an API call. Particularly, the endpoint reference storage 161 comprises a list of aliases and a list of corresponding API calls, thereby providing a mapping between each alias and the corresponding API call, which may be stored in a database or any other suitable data structure. In examples where the API is a REST API, the corresponding API calls each comprise a URI to call. The corresponding API calls may also include a list of any parameters that should be applied to the call.

The parser 110 uses the list of aliases to identify aliases in the query. In one example, the parser 110 identifies the aliases by searching the text of the query aliases, for example using a regular expression.

In a further example, the parser 110 is configured to transform the query into a data structure, such as a parse tree, abstract syntax tree or other hierarchical structure. In certain examples, this may involve performing lexical analysis (e.g. tokenization) of the query before transforming it into the data structure using a predefined grammar. The parser 110 may be configured to carry out top-down or bottom-up parsing. Once the data structure has been generated, the parser 110 is then configured to traverse the data structure to identify elements that match an alias.

For each alias that is discovered in the query, the parser 110 adds the corresponding API call to a list. In one example, the parser 110 also identifies the columns referred to in the query of each notional database table referred to by an alias. For example, the parser 110 identifies the columns "Id", "Name", "Description" "Category" and "Balance" as columns of the table alias "Accounts" in the query shown in FIG. 3. In one example, the parser 110 also identifies any filters (e.g. SQL WHERE clauses) associated with each alias. Once the query has been fully parsed, the parser 110 is configured to pass the list to the API call executor 120.

The API call executor 120 is configured to execute the calls to each of the API endpoints 212 specified in the list and retrieve the results. The API call executor 120 is configured access the API endpoints 212 via a suitable network interface (not shown) and any suitable network connections, including wired and/or wireless network links, the Internet, leased lines and so on.

The API call executor 120 accesses the relevant URI for each API call with any relevant parameters specified, for example based on any identified filters. For example, where the filter specifies a particular column is equal to a given value or in a particular range, it may be possible to specify this in the API call (e.g. company_name="Sage" or balance>0). The API call executor 120 then receives the results of the call from the endpoint 212. In one example, the API call executor 120 is configured to insert a common parameter that should be included in each API call—such as the tenant ID—into each of the API calls.

The API call executor 120 is configured to store the retrieved results in the storage 160, particularly in the call result storage 162.

In one example, the call result storage 162 comprises a database, and the API call executer 120 stores the results by uploading the result of each call to the database. The database may comprise a table corresponding to each API call. Each table comprises the columns identified by the parser 110 in the query. The database may be a relational database, and may support SQL queries thereof.

In one example, the call result storage 162 is temporary. Particularly, the API call executor 120 is operable to create a suitable call result storage 162 having database tables and columns corresponding to those identified by the parser 110 in the query, before executing the API calls. After the query engine 130 has executed the query on the call result storage 162, the call result storage 130 may then be deleted or discarded.

The API call executor 120 is configured to parse the result of each API call, so as to extract the data so it may be more easily entered into the database or stored by other means. For example, the API call executor 120 may comprise a JSON parser or an XML parser operable to parse the results and extract the relevant attributes and values therefrom. In one example, the database is an in-memory database, which is configured to reside primarily in memory (e.g. in RAM), rather than on disk storage. Accordingly, the database may be updated and accessed very quickly, because the seek time associated with memory is much shorter than for magnetic disks.

In further examples, the call result storage 162 may comprise flat files, spread sheets or other suitable storage means.

The query engine 130 is operable to execute the query on the results retrieved by the API call executor 120.

In examples where the results are stored in a database in the call result storage 162, the query engine runs the query against the database, for example by replacing the aliases in the query with references to the tables in the database in which the relevant results of the API calls are stored. As the database supports SQL queries, complex and flexible operations may be specified by the query, such as joins (including inner, left/right outer and so on), filters (e.g. SQL WHERE clauses), sub-queries, and the like.

The query engine 130 is configured to provide the results to user 300 via the interface 150. In the examples where the interface 150 is a GUI such as the GUI 400, the interface 150 is configured to display the results in the results display panel 430. In further examples where the interface 150 comprises a network interface, the results may be provided to the system operated by the user in a message of a suitable protocol.

In use, the system 100 receives a query from a user via the interface 150. The query is passed to the parser 110, which analyses the query and generates a list of API calls that are required to retrieve the data needed for the query. The parser 110 may use data stored in the endpoint reference storage 161 to identify the API calls that are required.

Next, the list of API calls are passed to the API call executor 120, which accesses the relevant APIs 212 of the relevant applications 210 in the cloud system 200. The API call executor 120 receives the results of the API calls and stores the results in the call result storage 162.

Finally, the query engine 130 executes the query against the results of the API calls, and returns the results to the user 300.

Figure 2:
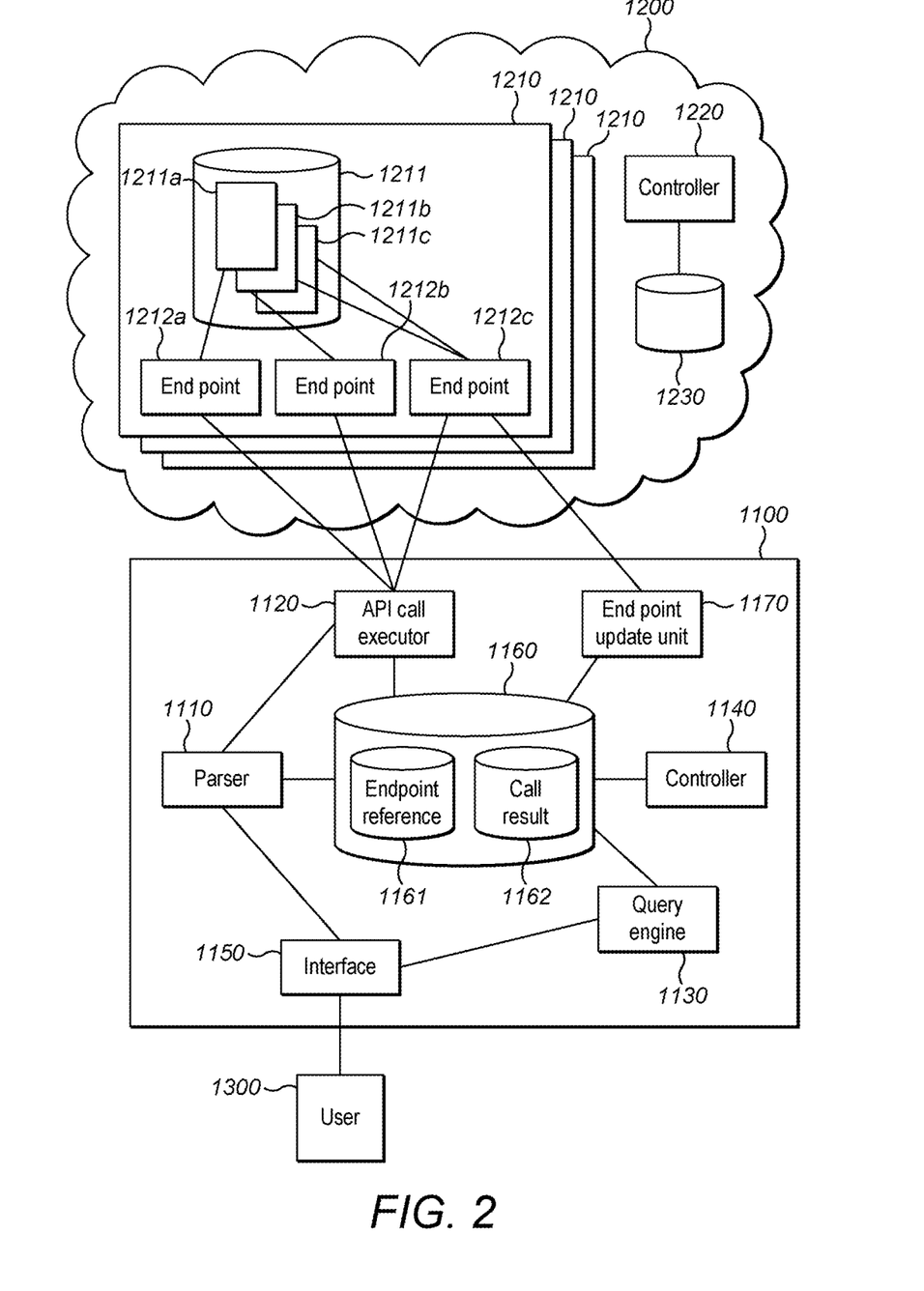
FIG. 2 is a schematic block diagram of a further example system for retrieving data from one or more server computers.

FIG. 2 shows a further example of a system 1100 for retrieving data from one or more server computers, and cloud system 1200. The systems 1100 and 1200 are substantially as described above, and therefore the detailed description of the systems and their corresponding elements will not be repeated.

System 1100 differs from system 100 in that it further comprises an endpoint update unit 1170. The endpoint update unit 1170 is configured to update and maintain the data stored in the endpoint reference storage 1161.

The API endpoints 212a-c may be configured to make a service definition available. The service definition describes the type of information that is made available. The definition includes the URI of the endpoint, an alias that effectively acts as a service title that broadly defines the type of the entity (e.g., Customer, Employee, Payee, etc.) served by the service, and the names of the fields made available by the endpoint.

In further examples, the service definition also includes information indicating whether the endpoint supports the fetching of individual fields, as opposed to simply permitting fetching all fields provided by the endpoint, If individual field selection is permitted, the service definition also includes information indicating how the individual fields may be selected, such as a URI including a placeholder that may be replaced by field names, e.g., https://systemxyz.com/api/[EntityName]?$select=[comma separated EntityField list].

In addition, the service definition may also include information indicating whether the endpoint supports the filtering of data, and if so, information indicating how the data may be filtered, such as a URI including a placeholder that may be replaced by a suitable expression for filtering the data, e.g., https://systemxyz.com/api/[EntityName]?$filter=[boolean expression using one or more comparisons]. In further examples, the service definition also includes the types of data each field stores and/or any other parameters that either must be or may optionally be passed to the API endpoint 212.

In other examples, the service definition may be provided by a separate cloud resource that stores service definitions of various services, thereby acting as a directory of services. It will be understood that a single service definition may describe multiple API endpoints for a particular source system.

For example, an API endpoint 212 that provides payee data for an accountancy application may require a tenant ID as a parameter, and may optionally take a payee ID as a parameter, and return the ID, name, address and banking details. Accordingly, such an endpoint 212 has a service definition having an alias of "Payee", defining the parameters and whether they are mandatory, and list the field names and whether they individually retrievable.

Accordingly, the endpoint update unit 1170 is configured to access the made available by each endpoint 212, and store that definition in the endpoint reference storage 1161, so that the parser 1110 can employ the definitions when generating the API calls.

In one example, the endpoint update unit 1170 is configured to derive an alias for the endpoint reference, based on the alias provided in the service definition. For example, the abovementioned API may be given the alias "payee". Accordingly, the data in the endpoint reference 1161 may automatically be obtained and updated. The data stored in the endpoint reference 1161, including the automatically derived aliases and the retrieved field definitions, may effectively act as a database schema for the cloud-stored data, and therefore can also be used as a reference by a user writing a query.

In use, the endpoint update unit 1170 may obtain and update the service definitions periodically, or in response to a user command. Alternatively, the service definitions may be obtained dynamically, particularly in instances where the services and service definitions are compliant with a well-defined standard such as OData.

Figure 3:
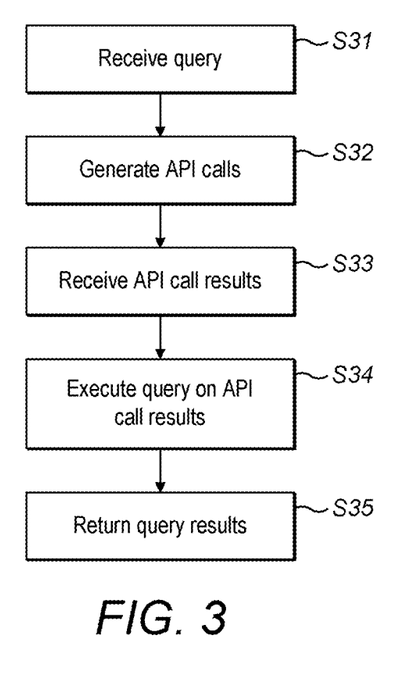
FIG. 3 is a flowchart of an example method of retrieving data from one or more server computers.

A method of retrieving data from one or more server computers will now be described with reference to FIG. 3.

The method includes a step S31 of receiving a query from a user 300. The method includes a step S32 of generating a plurality of API calls to one or more server computers 200 from the query. The method includes a step S33 of receiving the results of the API calls. The method includes a step S34 of executing the query on the received results. The method includes a step S35 of returning the query results to the user 300. Further steps may be included in the method, as have been described herein.

The above-described system and methods may advantageously allow a user to execute a query, such as an SQL query, against a plurality of cloud-stored data sources. The data from the plurality of cloud sources may then be joined, filtered and manipulated in a manner that would not typically be possible for data provided by REST APIs without undertaking significant software development, and which would be unable to easily adapt to changes in the service definitions.

Advantageously, a user can effectively query this remote data as if it were data stored in a traditional relational database, using a language such as SQL which is both well-known and well-defined. Accordingly, the systems and methods are advantageously easy to operate, and enable powerful and complex queries, which are particularly useful in reporting applications, such as financial reporting applications.

Furthermore, the ability to query remote data provided by cloud services in this fashion allows user queries to take advantage of publicly available data, such as exchange rates, and easily include them in queries.

As the detailed above, in certain embodiments, complex and flexible operations may be specified by a query, such as joins (including inner, left/right outer and so on), filters (e.g. SQL WHERE clauses), sub-queries, and the like. For example, data can be fetched from endpoints that may exist in different APIs, and useful database queries, like joins, can be performed across them.

For example, a company could store its employee data in www.rsvsiern.com and its salary information for those employees in www.payrollsystem.com. There is a relationship between the data but it is stored in two different systems. A manager working at this company may want to view a list of all his direct reports and their salaries. In relational databases the use of joins is very common to bring back related data from two or more tables. A system in accordance with embodiments of the invention could be used to perform such a join across the data from the two systems.

For example, if a table EMPLOYEE represents the employee data accessed from endpoint https://www.hrsystem.com/employees and SALARIES represents the salary data accessed from endpoint https://www.hrsystem.com/salaries then the list the manager queries could be generated by a SQL query corresponding to:

SELECT EMPLOYEE.Name, SALARIES.GrossSalary
FROM EMPLOYEE INNER JOIN SALARIES
ON
   EMPLOYEE.EmployeeID=SALARIES.EmployeeID In certain examples, systems in accordance with certain embodiments of the invention are adapted to process stored procedures and batch SQL statements. Many modern databases, for example those based on Oracle and Microsoft SQL Server, provide the ability to execute multiple SQL statements in a batch or via stored procedures while also adding a similar and well understood dialect to provide variable declaration, variable assignment, control-flow and looping statements to increase control and flexibility. In certain embodiments, this is supported by allowing multiple queries to be executed and by supporting the declaration of variables, variable assignment, control-flow and looping statements.

An example variable declaration syntax comprises:
DECLARE variablename variabletype
Eg. DECLARE Name VARCHAR
An example variable assignment syntax comprises:
SET variablename=variablevalue
Eg. SET Name='John'
An example control flow syntax comprises:
IF condition batchtoexecuteiftrue [ELSE batchtoexecuteiftrue]
An example looping syntax comprises:
WHILE condition batchtoexecute The provision of the above capabilities facilitates programmable logic thereby enabling more powerful extraction and transformation capabilities to be provided.

In certain embodiments, custom SQL functions can be introduced into the SQL dialect. The SQL dialect that can be supported is a large subset of the dialect defined in the ANSI SQL standard but, in accordance with certain embodiments of the invention, extra extensibility can be provided by the creation of custom functions. Common SQL functions include SUBSTRING, DATEPART. A SQL function is useful in that it can provide data transformation by returning a value derived from performing a calculation against the value of a column or a complex SQL expression. Thus, if a calculation is required which cannot be satisfied with the standard functions in certain embodiments, new ones can be introduced.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A system, including a processor, for retrieving data from one or more server computers comprising:
    a parser operable to generate a plurality of application programming interface, API, calls to a plurality of API endpoints of the one or more server computers from a query, each API endpoint having an address and being configured to provide a particular subset of data, wherein the parser is further operable to identify one or more aliases in the query and wherein the plurality of API calls generated each correspond to the one or more aliases in the query identified, and wherein each alias corresponds to the address of one of the plurality of API endpoints;
    an API call executor operable to execute the API calls to receive results from one or more API endpoints having an address corresponding to the one or more aliases identified in the query, the received results from each API endpoint being related to the particular subset of data for said API endpoint, and receive results of the execution of at least a portion of the API calls; and
    a query engine operable to execute the query on the received results of the API call executor, wherein the plurality of API endpoints are a Representational State Transfer, REST, endpoint.

2. The system of claim 1, wherein the query is a Structured Query Language, SQL, query.

3. The system of claim 1, wherein the parser is operable to transform the query into a data structure and identify the one or more aliases from the data structure.

4. The system of claim 3, wherein the parser is operable to identify the aliases using endpoint reference data, the endpoint reference data comprising a list of aliases and corresponding API endpoints.

5. The system of claim 4, wherein the system further comprises an endpoint update unit, the endpoint update unit operable to update the endpoint reference data by accessing a service definition corresponding to the API endpoints.

6. The system of claim 1, wherein individual API endpoints of the plurality of API endpoints are operable to provide data from a remote data store of one of the server computers as the results.

7. The system of claim 1, wherein the received results are in one of Javascript Object Notation, JSON, format or Extensible Markup Language, XML, format.

8. The system of claim 1, wherein the API call executor is further operable to store the received results in a call result storage.

9. The system of claim 8, wherein the call result storage comprises a call result database, wherein the API call executor is operable to parse the received results and store the received results in the call result database, and wherein the query engine is operable to execute the query against the call result database.

10. The system of claim 9, wherein the call result database is an in-memory database.

11. The system of claim 1, wherein the system comprises a graphical user interface operable to receive a user query and display the results.

12. The system of claim 1, wherein the system comprises a network interface operable to receive a query from a user and provide the results to the user over a network connection.

13. A method of retrieving data from one or more server computers, comprising:
    generating a plurality of application programming interface, API, calls each to one of a plurality of API endpoints of the one or more server computers from a query, each API endpoint having an address and being configured to provide a particular subset of data, further comprising identifying one or more aliases in the query, wherein the plurality of API calls generated each correspond to the one or more aliases in the query identified, and wherein each alias corresponds to the address of one of the plurality of API endpoints;

executing the API calls to the plurality of API endpoints;

receiving results of the execution of at least a portion of the API calls from the plurality of API endpoints having an address corresponding to the one or more aliases identified in the query, the received results from each API endpoint being related to the particular subset of data for said API endpoint; and executing the query on the received results from the API calls, wherein the one or more API endpoints is a Representational State Transfer, REST, endpoint.

14. The method of claim 13 further comprising transforming the query into a data structure and identifying the one or more aliases from the data structure.

15. The method of claim 14 further comprising:
identifying aliases using endpoint reference data, the endpoint reference data comprising a list of aliases and corresponding API endpoints; and
updating the endpoint reference data by accessing a service definition corresponding to the API endpoints.

16. The method of claim 13, wherein individual API endpoints of the plurality of API endpoints are operable to provide data from a remote data store of one of the server computers as the results.

17. The method of claim 13 further comprising storing the received results in a call result storage.

18. A non-transitory computer readable storage medium having instructions recorded thereon which, when executed, cause a computing device to perform the claim 13.

* * * * *